(12) United States Patent
Hu et al.

(10) Patent No.: US 6,883,631 B2
(45) Date of Patent: Apr. 26, 2005

(54) EXTERNAL AIR BAG OCCUPANT PROTECTION SYSTEM

(75) Inventors: Jailou Hu, West Bloomfield, MI (US); Gopal Narwani, Warren, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 123 days.

(21) Appl. No.: 10/313,840

(22) Filed: Dec. 6, 2002

(65) Prior Publication Data

US 2003/0155750 A1 Aug. 21, 2003

Related U.S. Application Data

(60) Provisional application No. 60/338,213, filed on Dec. 6, 2001.

(51) Int. Cl.[7] ............................. B60T 7/22; B60K 28/12
(52) U.S. Cl. ...................................... 180/274; 180/282
(58) Field of Search ............................... 180/274, 282; 280/730.1, 730.2, 748, 729, 743.1, 728.1

(56) References Cited

U.S. PATENT DOCUMENTS

| | | | |
|---|---|---|---|
| 3,481,625 A | 12/1969 | Chute | 280/150 |
| 3,614,127 A | 10/1971 | Glance | 280/150 AB |
| 3,708,194 A | 1/1973 | Amit | 293/1 |
| 3,752,501 A | 8/1973 | Daniel et al. | 280/150 AB |
| 3,791,667 A | 2/1974 | Haviland | 280/150 AB |
| 3,794,997 A | 2/1974 | Iwatsuki et al. | 343/7 ED |

(Continued)

FOREIGN PATENT DOCUMENTS

| | | | | |
|---|---|---|---|---|
| DE | 40 37 485 A1 | 5/1992 | ........... | B60R/21/16 |
| DE | 41 23 948 A1 | 1/1993 | ........... | B60R/19/42 |
| DE | 44 26 090 A1 | 7/1995 | ........... | B60R/21/16 |
| GB | 1 441 598 | 7/1976 | ............. | B60J/5/04 |
| JP | 406144154 A | 5/1994 | ........... | B60R/21/34 |
| JP | 7-329705 | 12/1995 | ........... | B60R/21/34 |

OTHER PUBLICATIONS

Timothy J. Bomya, *Magentic Sensor*, U.S. Application No. 09/648,601, Filed Aug. 26, 2000, U.S. Pat. 6,631,776.

W. Todd Watson et al., *Vehicle Rollover Sensing System*, U.S. Provisional Application No. 60/272,611, Filed Mar. 1, 2001, U.S. Pat. 6,529,811.

*Primary Examiner*—Christopher P. Ellis
*Assistant Examiner*—Joselynn Y. Sliteris
(74) *Attorney, Agent, or Firm*—Raggio & Dinnin, P.C.

(57) ABSTRACT

A plurality of gas generators provide for controllably inflating a plurality of inflatable confinements responsive to a prediction by a predictive collision sensor of both a size of an expected collision object and an expected location of the collision. The inflatable confinements are associated with different zones across a door of a vehicle, each zone having an associated structural stiffness and level of proximity to the occupant. For a pole-like object expected to impact a relatively less-stiff zone of the vehicle, the inflatable confinements are controlled so as to deflect the point of impact towards a stiffer zone away from the occupant. For a barrier-like object, inflatable confinements associated with relatively stiff zones are inflated relatively higher than those associated with relatively less stiff zones so as to transfer impact energy to the relatively stiff zones.

54 Claims, 10 Drawing Sheets

U.S. PATENT DOCUMENTS

| | | | |
|---|---|---|---|
| 3,822,076 A * | 7/1974 | Mercier | 293/107 |
| 3,861,710 A * | 1/1975 | Okubo | 280/735 |
| 4,300,116 A | 11/1981 | Stahovec | 340/32 |
| 4,864,298 A | 9/1989 | Dombrowski | 340/904 |
| 4,966,388 A | 10/1990 | Warner et al. | 280/730 |
| 5,033,236 A | 7/1991 | Szerdahelyi et al. | 49/502 |
| 5,072,966 A | 12/1991 | Nishitake | 280/730 |
| 5,172,790 A | 12/1992 | Ishikawa et al. | 180/268 |
| 5,224,732 A | 7/1993 | Warner et al. | 280/730 |
| 5,273,309 A | 12/1993 | Lau et al. | 280/730 A |
| 5,277,441 A | 1/1994 | Sinnhuber | 280/730 R |
| 5,282,646 A | 2/1994 | Melvin et al. | 280/729 |
| 5,333,899 A | 8/1994 | Witte | 280/730 A |
| 5,358,273 A | 10/1994 | Onishi et al. | 280/743 R |
| 5,362,101 A | 11/1994 | Sugiura et al. | 280/743 A |
| 5,364,125 A | 11/1994 | Brown et al. | 280/730 A |
| 5,446,661 A | 8/1995 | Gioutsos et al. | 364/424.05 |
| 5,447,326 A | 9/1995 | Laske et al. | 280/728.3 |
| 5,490,069 A | 2/1996 | Gioutsos et al. | 280/735 |
| 5,530,548 A | 6/1996 | Campbell et al. | 356/623 |
| 5,533,752 A | 7/1996 | Brown et al. | 280/739 |
| 5,581,232 A | 12/1996 | Tanaka et al. | 340/435 |
| 5,646,613 A | 7/1997 | Cho | 340/903 |
| 5,732,785 A | 3/1998 | Ran et al. | 180/271 |
| 5,769,452 A | 6/1998 | Yoshida | 280/735 |
| 5,899,489 A | 5/1999 | Jost | 280/730.2 |
| 5,923,280 A | 7/1999 | Farmer | 342/70 |
| 5,959,552 A | 9/1999 | Cho | 340/903 |
| 5,992,794 A | 11/1999 | Rotman et al. | 244/17.17 |
| 6,085,151 A | 7/2000 | Farmer et al. | 701/301 |
| 6,087,928 A | 7/2000 | Kleinberg et al. | 340/436 |
| 6,097,332 A | 8/2000 | Crosby, II | 342/72 |
| 6,182,782 B1 * | 2/2001 | Matsuura et al. | 180/274 |
| 6,203,060 B1 | 3/2001 | Cech et al. | 280/735 |
| 6,209,909 B1 | 4/2001 | Breed | 280/735 |
| 6,225,918 B1 | 5/2001 | Kam | 340/903 |
| 6,227,325 B1 | 5/2001 | Shah | 180/274 |
| 6,308,983 B1 | 10/2001 | Sinnhuber | 280/735 |
| 6,317,048 B1 | 11/2001 | Bomya et al. | 340/573.1 |
| 6,343,810 B1 * | 2/2002 | Breed | 280/730.2 |
| 6,417,764 B1 | 7/2002 | Tonkin | 340/425.5 |
| 6,502,856 B1 * | 1/2003 | Shaklik et al. | 280/735 |
| 6,529,811 B1 * | 3/2003 | Watson et al. | 701/45 |
| 6,560,519 B1 * | 5/2003 | Williams et al. | 701/45 |
| 6,623,033 B1 | 9/2003 | Breed | 280/735 |
| 6,685,218 B1 * | 2/2004 | Breed et al. | 280/730.2 |
| 2002/0092693 A1 | 7/2002 | Breed | 180/282 |
| 2002/0093180 A1 | 7/2002 | Breed | 280/730.1 |

\* cited by examiner

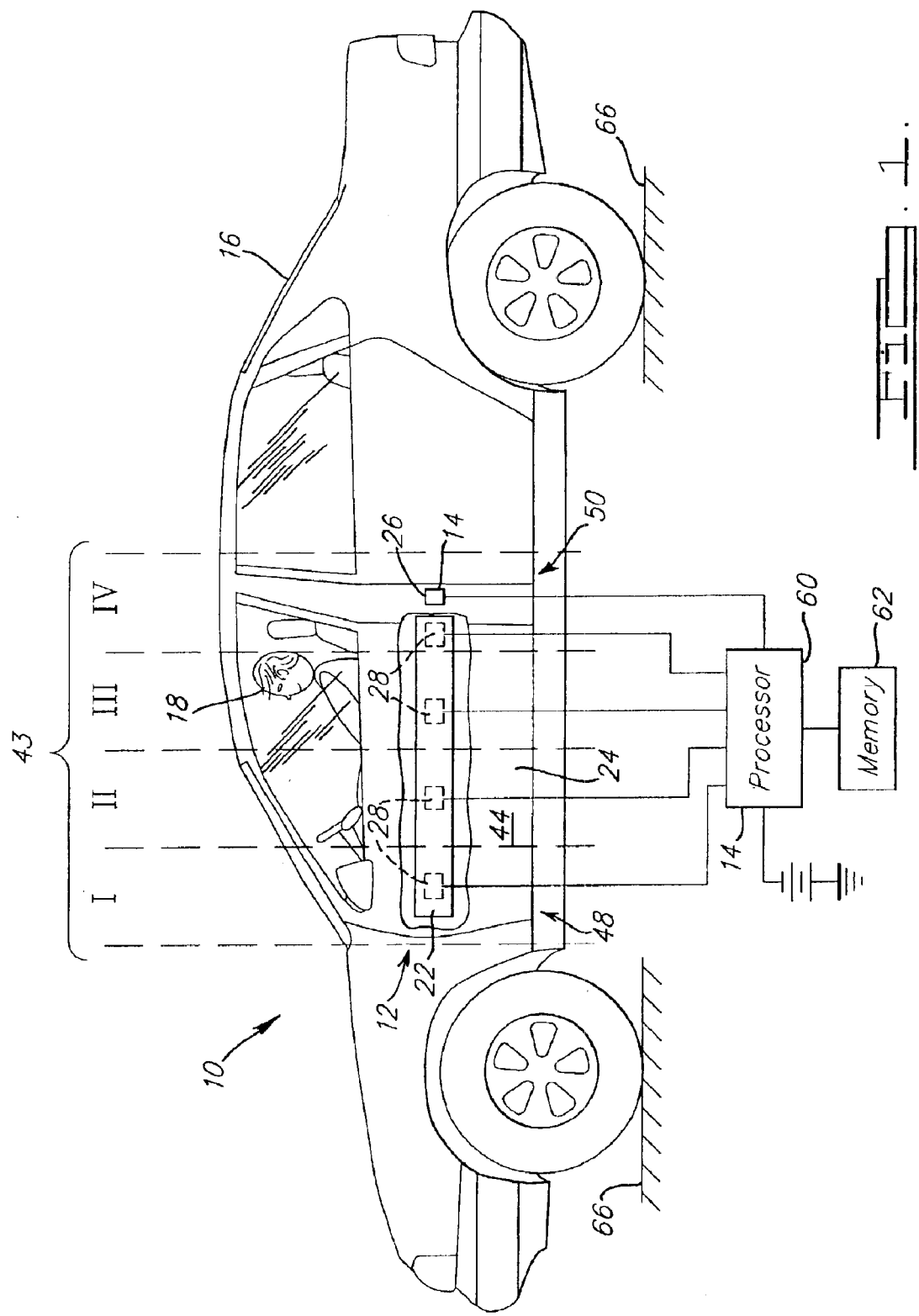

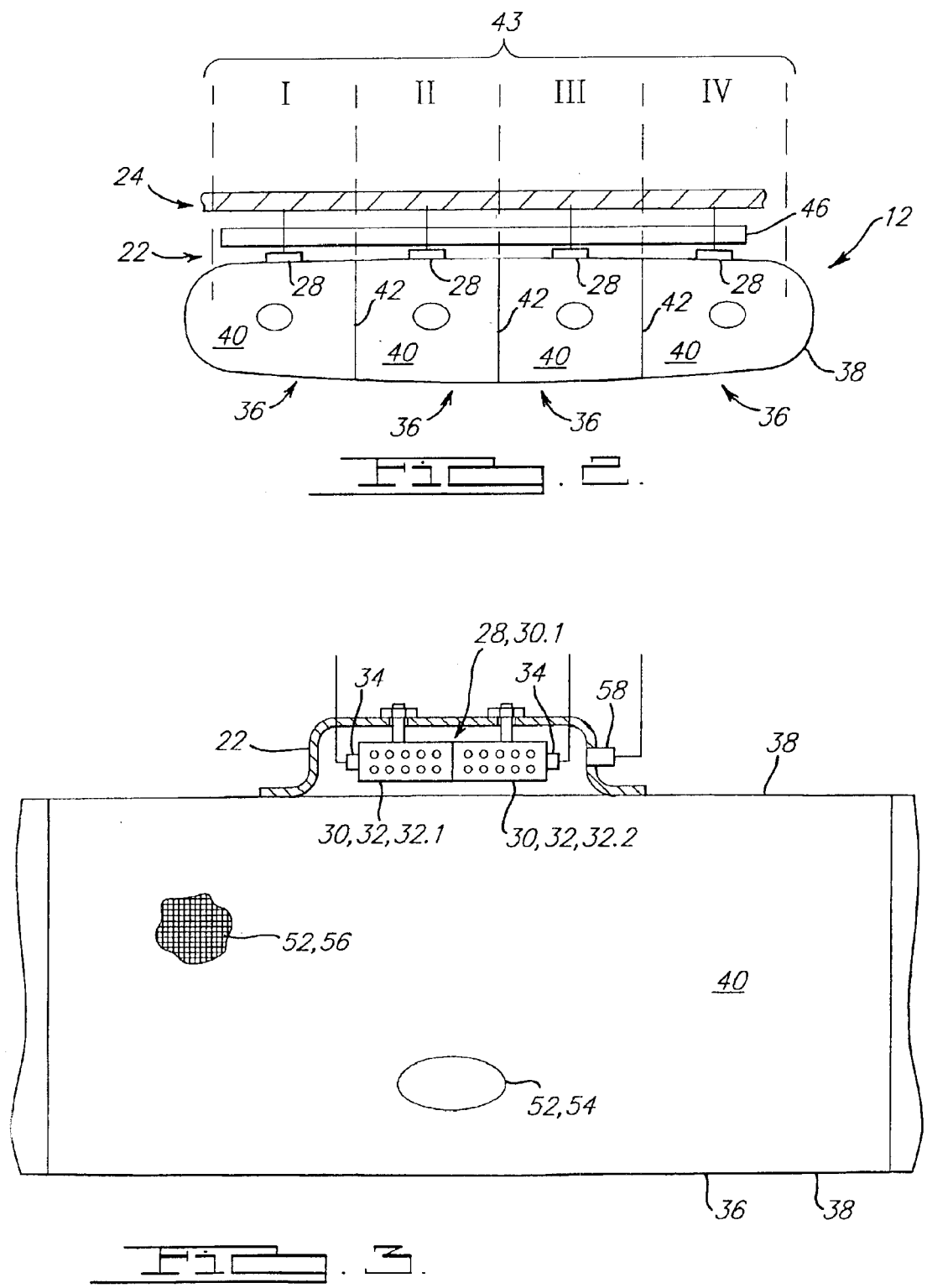

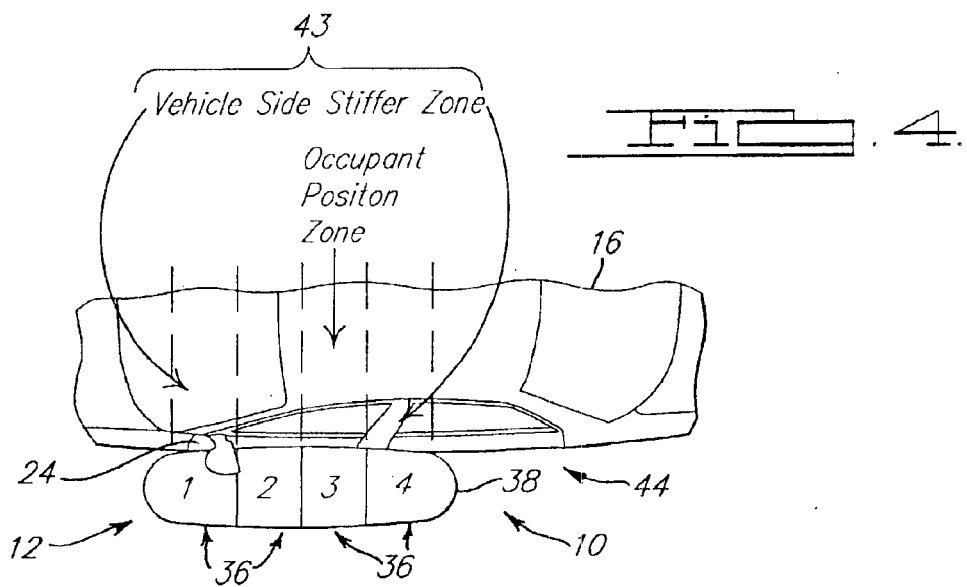
FIG. 4.
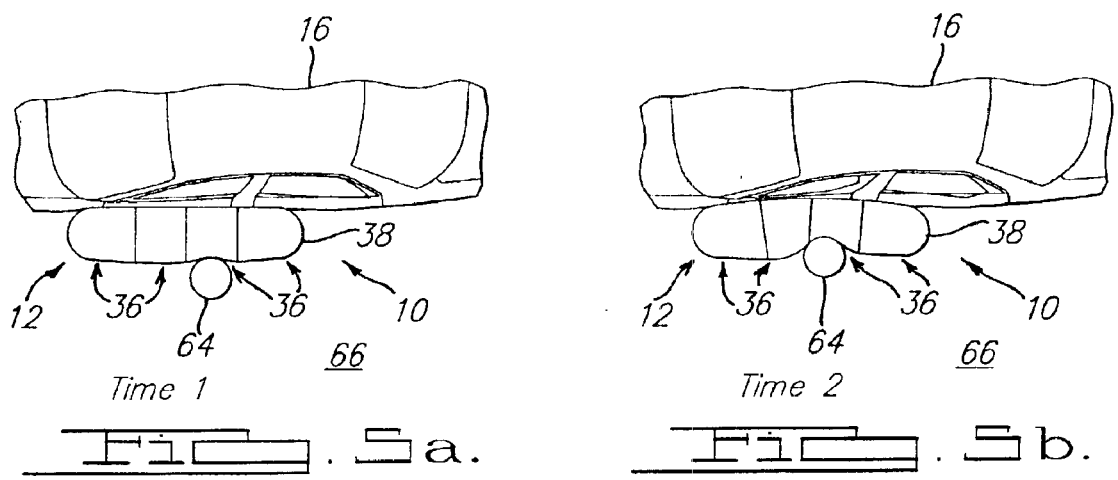
Time 1     FIG. 5a.     Time 2     FIG. 5b.
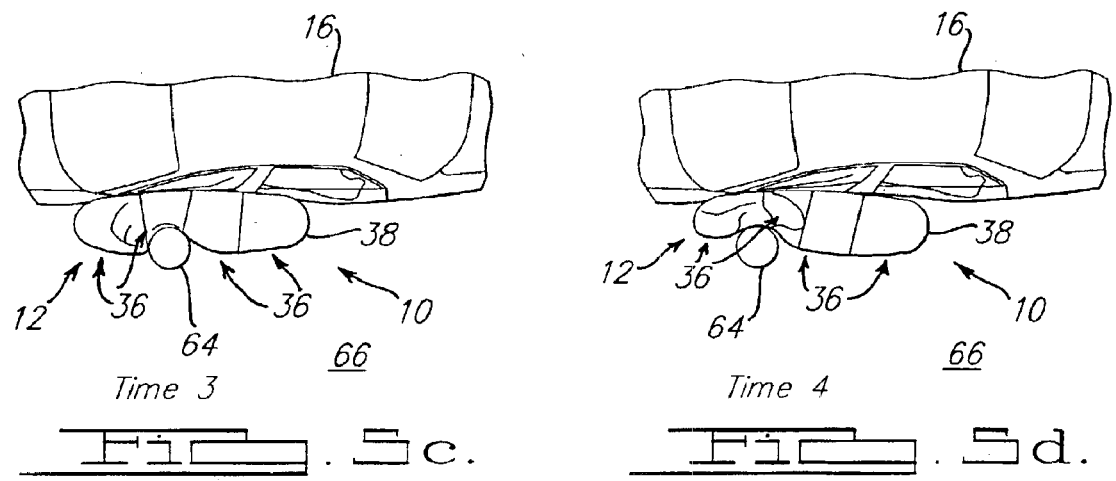
Time 3     FIG. 5c.     Time 4     FIG. 5d.

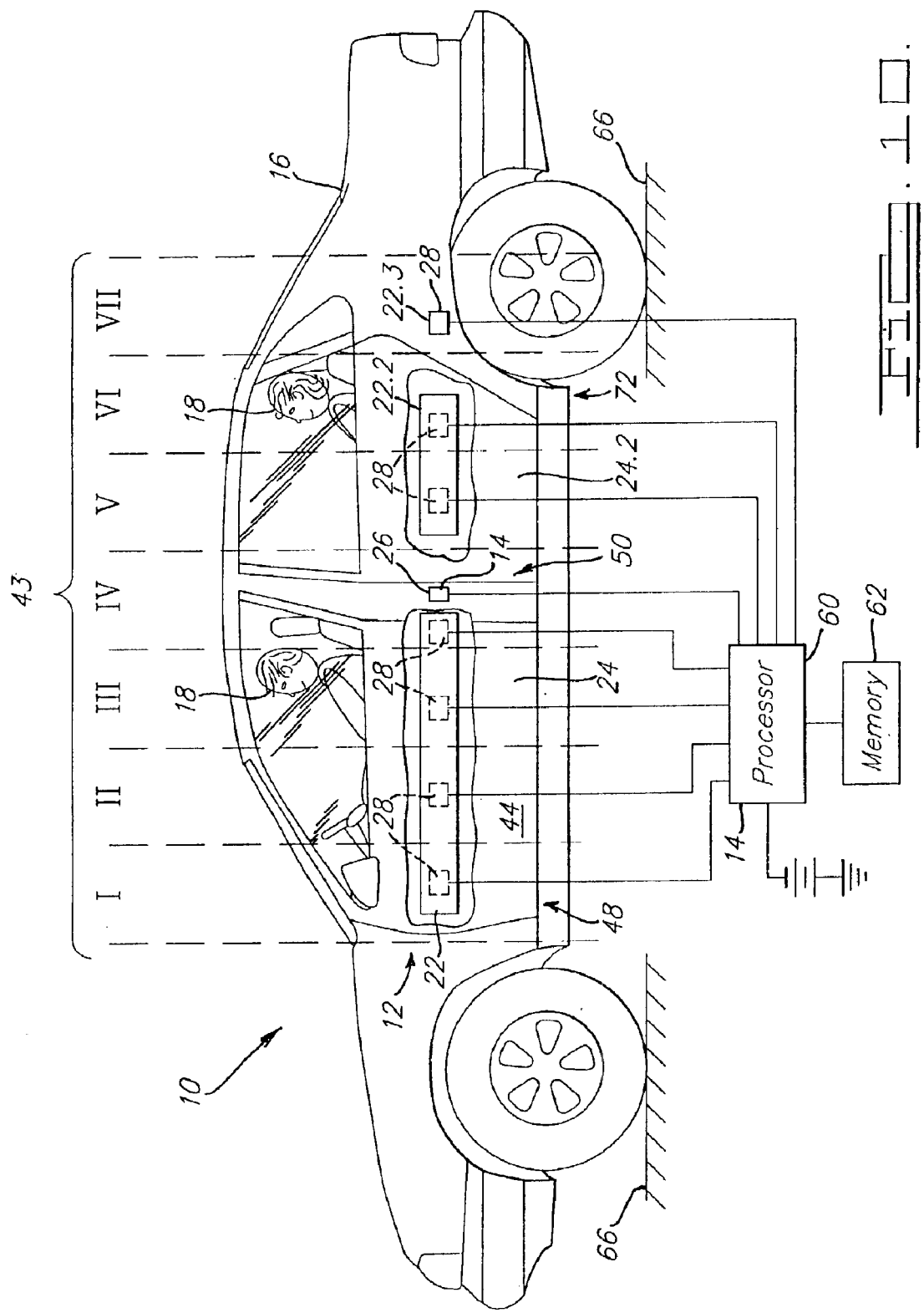

EXTERNAL AIR BAG OCCUPANT PROTECTION SYSTEM

The instant application claims the benefit of U.S. Provisional Application Ser. No. 60/338,213 filed on Dec. 6, 2001, which is incorporated herein by reference.

In the accompanying drawings:

FIG. 1 illustrates an embodiment of an occupant protection system incorporated in a side portion of a vehicle;

FIG. 2 illustrates a cross-sectional view of an embodiment of an external air bag inflator module mounted in a door of a vehicle, wherein the associated external air bag is inflated;

FIG. 3 illustrates an embodiment of an inflatable confinement and a multi-stage gas generator of an external air bag inflator module, wherein the inflatable confinement is inflated;

FIG. 4 illustrates an example of a multi-chamber external air bag inflated prior to a side-impact collision;

FIGS. 5a–5d illustrates a vehicle being impacted by a pole-like object under FMVSS 201 conditions, and the operation of an embodiment of an occupant protection system responsive to the collision;

FIG. 10 illustrates other embodiments of an occupant protection system incorporated in a side portion of a vehicle;

FIG. 16 illustrates a cross-section of the external air bag system of FIG. 15;

Figures 6, 7:
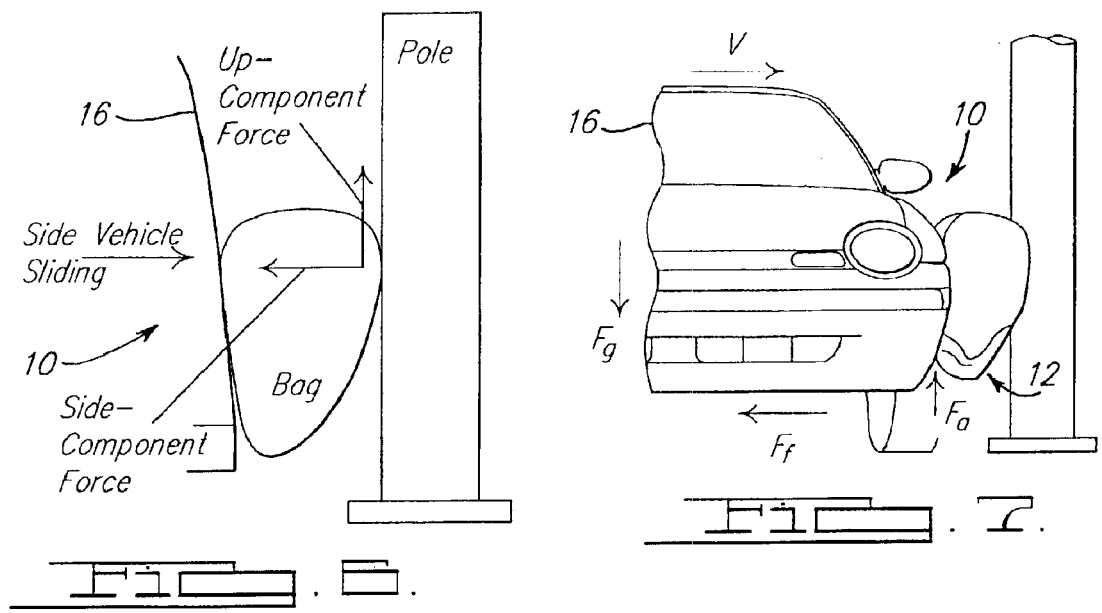
FIG. 6 illustrates a cross-section of an embodiment of an external air bag adapted to reduce sliding friction of the vehicle.
FIG. 7 illustrates forces acting on the vehicle during a side-impact collision, wherein the vehicle incorporates a predictive collision sensing system and an external air bag adapted to reduce sliding friction of the vehicle.

Referring to FIG. 1, an occupant protection system 10 comprising an external air bag system 12 and a predictive collision sensing system 14 is incorporated in a vehicle 16 for protecting an occupant 18 from injury responsive to a collision. For example, the occupant protection system 10 illustrated in FIG. 1 is adapted to protect an occupant 18 from a side-impact collision. The associated external air bag system 12 comprises at least one external air bag inflator module 22 that is mounted in a door 24 proximate to the seating location of the occupant 18 to be protected. The predictive collision sensing system 14 comprises at least one predictive collision sensor 26 mounted at a location on the vehicle 16 having a field of view that is sufficient to see an external object at a distance that is sufficiently far to provide sufficient time deploy the external air bag system 12 if the predictive collision sensing system 14 would then predict that that the vehicle 16 and the object are likely to collide at a future time at a location proximate to the at least one external air bag inflator module 22.

Referring also to FIGS. 2 and 3, the at least one external air bag inflator module 22 comprises a plurality of associated gas generator modules 28, each of which comprises at least one gas generator 30, or at least one stage 32 of a multi-stage gas generator 30.1, wherein each gas generator 30 or stage 32 can be independently deployed—e.g. by activation of an associated squib 34, or electric primer—and is characterized by an associated inflation characteristic. A gas generator module 28 incorporating a plurality of gas generators 30 or a multi-stage gas generator 30.1 provides for an associated controllable inflation characteristic, which, for example, could also be provided by a pressurized tank with a controllable discharge orifice.

Each of the plurality of gas generator modules 28 is operatively coupled to an associated one of a plurality of inflatable confinements 36, so that there is a one-to-one relationship between the gas generator modules 28 and the corresponding inflatable confinements 36. As an example, FIG. 2 illustrates an external air bag 38 having a plurality of chambers 40 that are isolated from one another by associated baffles 42, wherein each chamber 40 constitutes an inflatable confinement 36.

For example, a first stage 32.1 of a multi-stage gas generator 30.1 would provide a sufficient amount of gas so as to provide for a nominal energy absorption capacity by the associated inflatable confinement 36, and a second stage 32.2 would provide additional gas so as to provide for a higher energy absorption capacity, as necessary depending upon the nature of the associated side-impact collision.

The respective gas generator modules 28 and associated inflatable confinements 36 are arranged across the door 24 so that when inflated as illustrated in FIG. 2, the inflatable confinements 36 are adjacent to one another, each associated with—i.e. aligned with—a different zone I, II, III and IV (43) of the associated side 44 of the vehicle 16. Each zone I, II, III and IV (43) has an associated level of structural stiffness and an associated level of proximity to the occupant 18. For example, zones I and IV (43) are proximate to the A-pillar 48 and the B-pillar 50 respectively, which each have a relatively high level of structural stiffness and which are relatively less proximate to the occupant 18 than are zones II and III (43). Accordingly, an occupant 18 would generally be more susceptible to injury from an impact of the vehicle 16 in either zones II or III (43)—which, being relatively less stiff, are more susceptible to crush responsive to an impact—than from an impact in either zones I or IV (43). A reinforcing beam 46 in the door 24 provides a reaction member that absorbs some side-impact energy and distributes side-impact forces to the A-pillar 48 and the B-pillar 50 provided that the associated inflatable confinements 36 are located relative to the reinforcing beam 46 so that the associated side-impact forces from the inflatable confinements 36 responsive to a collision are reacted by the reinforcing beam 46, wherein the side-impact forces are generating by the interaction of a colliding object with one or more inflated inflatable confinements 36. Whereas the gas generator modules 28 are illustrated in FIG. 1 at a height that is proximate to that of the reinforcing beam 46, it should be understood that the gas generator modules 28 could be located at a different height that is within the range of heights of the associated inflated inflatable confinement 36.

Referring to FIG. 3, an inflatable confinement 36 comprising a chamber 40 of the external air bag 38, is operatively coupled to a gas generator module 28 comprising a multi-stage gas generator 30.1 comprising two stages 32.1, 32.2, each activated by an associated squib 34. The inflatable confinement 36 is constructed from a flexible material, e.g. a woven fabric, e.g. of nylon, or a molded elastomeric or plastic material. The flexible material may be coated, e.g. with a silicone coating, e.g. on the inside of the inflatable confinement 36, so as to provide for sealing and/or strengthening the material, or to reduce the susceptibility of the material to the thermal effects of hot gases generated by a gas generator 30. Moreover, the outside of the flexible material may be coated to reduce friction. The inflatable confinement 36 further comprises a vent 52, e.g., at least one orifice 54 in an externally bounding surface thereof, i.e. in the outer surface of the external air bag 38 and not in a baffle 42 thereof. The vent 52 acts to discharge gas from the inflatable confinement 36 after the inflatable confinement 36 becomes pressurized, particularly as a result of a compression of the inflatable confinement 36 by an impinging object, whereby the pressure of the gas in the inflatable confinement 36 acts on the surface thereof to generate a force acting against the impinging object, and the discharge of gas through the vent 52 acts to dissipate the energy transferred from the impinging object to the inflatable confinement 36. For example, the vents 52 illustrated in FIGS. 2 and 3 are located on a lower surface of the external air bag 38 so as to direct exhaust gas downwards towards the road. The vent 52 may alternately comprise, or further comprise, a porous material 56 on at least a portion of an externally bounding surface of the external air bag 38.

Either the external air bag inflator module 22, or at least one associated inflatable confinement 36, may further comprise a means for sensing an interaction of the inflatable confinement 36 with an impinging object, e.g. for sensing the associated impact location. For example, the means for sensing the interaction of the inflatable confinement 36 with an impinging object may comprise either a pressure sensor 58, e.g. as disclosed in U.S. Pat. No. 5,769,452; or a tactile sensor, e.g. as disclosed in U.S. Pat. No. 6,308,983, both of which patents are incorporated herein by reference.

Referring to FIG. 1, the predictive collision sensor 26 is operatively coupled to a processor 60 having a memory 62. The processor 60 can also serve to control the actuation of the various gas generator modules 28 and to interface with the means for sensing an interaction of the inflatable confinement 36 with an impinging object, if provided, although separate processors in communication with one another can be provided for each of these various functions, or for sets thereof. The predictive collision sensor 26 can operate in accordance with any of a variety of technologies, including but not limited to radar, e.g. using electromagnetic waves, including RF and optical frequencies; ultrasonic range sensing; infrared triangulation, capacitive proximity sensing, magnetic imaging, and magnetic proximity sensing. For example, U.S. Pat. Nos. 4,300,116; 5,446,661; 5,490,069; 5,530,548; 5,923,280; 6,085,151 and 6,317,048; and U.S. application Ser. No. 09/648,601 filed on Aug. 26, 2000—all of which are incorporated by reference herein—disclose various technologies that could be incorporated in a predictive collision sensor 26. The predictive collision sensing system 14 provides an indication of whether the vehicle 16 is expected to collide with an object, a measure of the size of the object, and a measure of where on the vehicle 16 the object is expected to collide. This indication and these measures are provided at a time sufficiently before the actual collision so if one or more gas generator modules 28 are to be activated responsive to the collision, that the associated inflatable confinements 36 can be inflated prior to the impact of the object with the associated inflatable confinements 36. The predictive collision sensing system 14 may also provide a measure of the velocity of the object relative to the vehicle 16, e.g. so that the associated severity of the collision can be estimated for use in controlling the actuation of the gas generator modules 28.

In operation, the control of the actuation of the various gas generator modules 28 is responsive to the prediction by the predictive collision sensor 26 of both 1) the size (i.e. lateral extent) of an object that is expected to collide with the vehicle 16, and 2) the expected location of the collision.

If the object is relatively narrow, e.g. a pole-like object having a dimension less than or about that of the region of the vehicle 16 which is relatively less stiff and for which the occupant 18 is relatively more susceptible to injury responsive to a collision—e.g. the extent of zones II and III (43)—then the gas generator modules 28 are controlled in accordance to what is referred to herein as a "pole-crash" mode, wherein the inflatable confinements 36 are inflated in a manner that manipulates the kinematics of the vehicle 16 relative to the object so as to shift the point of impact to a location for which the occupant 18 is relatively less susceptible to injury, while also reducing the relative speed of the collision.

Referring to FIG. 4, an exemplary external air bag 38 comprises four (4) chambers corresponding to zones I, II, III and IV (43) that, for a typical mid-size car, has an overall length of about 1.5 meters (from A-pillar 48 to B-pillar 50) and a height of about 0.4 meters, wherein the total volume of the external air bag 38 is about 220 liters, the volumes of the associated inflatable confinements 36 of zones I and IV (43) are about 60 liters each, and the volumes of the associated inflatable confinements 36 of zones I and IV (43) are about 50 liters each. Each inflatable confinement 36 incorporates a vent 52 with a circular orifice 54 having a diameter of about 48 millimeters, although the mass flow of gas from the respective gas generator modules 28 to the respective inflatable confinements 36 can differ amongst the inflatable confinements 36. The gas generator modules 28 inflate the external air bag 38 in about 30 milliseconds, and the depth of the inflated external air bag 38 is about 0.37 meters prior to impact. For this fill time and depth, and for a closing speed of about 18 MPH, there is a period of about 75 milliseconds prior to when the object would otherwise impact the vehicle 16, before which the predictive collision sensing system 14 would need to predict the collision so that the gas generator modules 28 can be actuated. Responsive to the predictive collision sensing system 14 sensing the likelihood of an impact of a pole-like object with zones I or II (43) of the vehicle 16, each of the inflatable confinements 36 in all zones (43) is inflated with the first stage 32.1 of an associated multi-stage gas generator 30.1, so as to provide for a nominal level of energy absorption. It should be understood that the specific values of quantities provided herein are not considered to be limiting, but instead are examples for a particular system configuration.

FIGS. 5a–5d illustrate a simulation of a 1500 Kilogram vehicle 16 impacting a pole-like object 64 under FMVSS 201 conditions with the vehicle 16 moving at 18 MPH relative to the pole-like object 64, the later of which follows a trajectory that intersects the head of the occupant 18. The coefficient of friction between the vehicle 16 and ground 66 was assumed to be 0.15 for the simulation. Referring to FIG. 5a, the pole-like object 64 commences interaction with the inflatable confinements 36 of zone III (43) at a first time. Either prior to this time—responsive to a prediction of the impact location by the predictive collision sensing system 14,—or at that time—responsive to the a detection by the means for sensing an interaction of the inflatable confinement 36 with an impinging object, e.g. the pressure sensor 58,—each respective second stage 32.2 of respective multi-stage gas generators 30.1 associated with respective inflatable confinements 36 of zones III and IV (43) are activated so as to increase the associated pressures of those inflatable confinements 36. Accordingly, the supplemental inflation of the inflatable confinements 36 of zones III and IV (43) stiffens both the inflatable confinement 36 that is impacted by the pole-like object 64, and the adjacent inflatable confinement 36 proximate to the B-pillar 50, which causes the vehicle 16 to slide backwards relative to the pole-like object 64, so as to shift the eventual impact location of the pole-like object 64 away from zone III (43) where the occupant is positioned. Furthermore, the venting of gas from the various inflatable confinements 36 responsive to pressurization caused by the collision dissipates the associated collision energy, thereby reducing the relative velocity when the pole-like object 64 eventually impacts the vehicle 16. As illustrated in FIGS. 5b–d, the supplemental pressurization of the inflatable confinements 36 of zones III and IV (43) causes the vehicle to shift rearward relative to the pole-like object 64, so that the pole-like object 64—at a reduced velocity—eventually impacts the vehicle 16 proximate to the A-pillar 48. In the above simulation, this impact occurs more than 100 milliseconds after the initial contact of the pole-like object 64 with an inflatable confinement 36. Accordingly, the above-described action of the occupant protection system 10 shifts the point of impact from a relatively less stiff location at which the occupant 18 has a greater susceptibility to injury, to a relatively more stiff location for which the occupant 18 has a lower susceptibility to injury.

Generally, for a relatively narrow object that would contact only one, or a few, of the inflatable confinements 36 upon impact therewith, some of the inflatable confinements 36 are inflated differently than others so that the set of inflatable confinements 36 are asymmetrically loaded, thereby generating a transverse force component along the line of inflatable confinements 36 that acts upon the vehicle so as to shift the impact location of the object against the vehicle to a location for which the occupant 18 is less susceptible to injury responsive to the impact. For the arrangement of inflatable confinements 36 along a door 24 to provide for side-impact protection as illustrated in FIG. 4, the transverse force acts longitudinally with respect to the vehicle 16 so as to shift the vehicle either forwards or backwards relative to the object. Different inflatable confinements 36 are inflated differently by activating a different set of gas generators 30 or stages 32 of a multi-stage gas generator 30.1 for different gas generator modules 28 of different inflatable confinements 36. For example, some of the inflatable confinements 36 may be inflated with only a first stage 32.1, or with less than the maximum number of stages 32 available, whereas other of the inflatable confinements 36 are also inflated with an additional stage 32 or stages 32 of a multi-stage gas generator 30.1. Generally, the inflation pattern—i.e. which inflatable confinements 36 are inflated, by how much, and when—is dependent upon 1) the impact location, 2) the location and size of the vehicle specific zones (43), 3) the location of the center of gravity (CG) of the vehicle 16, and 4) the arrangement and size of the inflatable confinements 36. The inflation power for the inflatable confinements 36, individually and collectively, is dependent upon the impact speed, and upon the mass and stiffness of the vehicle 16. For an external air bag system 12 with a plurality of inflatable confinements 36 inflated by an associated plurality of gas generator modules 28, each having a plurality of gas generators 30 or stages 32, the occupant protection system 10 provides for a considerable range of control that can be utilized to accommodate different collision scenarios.

Responsive to a collision with a pole-like object 64 impacting in zones II or III (43) of the vehicle 16, the occupant protection system 10 inflates the external air bag system 12 so as to generate forces that cause the vehicle 16 to move relative to the pole-like object 64. This movement is impeded by frictional forces acting on the vehicle 16, e.g. between the ground 66 and the tires, and by the inertia of the vehicle 16. For many collisions, particularly high speed "pole crashes", the vehicle either becomes airborne—for which there is no friction with the ground 66,—or slides on the ground 66, which may at a lower friction than normal because of ice, snow, water. Moreover, the friction forces are lowered by sliding, since the coefficient of sliding friction is less than the associated coefficient of static friction. Notwithstanding the likelihood for reduced friction between the vehicle 16 and ground 66 during the collision, referring to FIGS. 6 and 7, the shape and/or folding pattern of the external air bag 38 can be adapted to further reduce frictional forces between the vehicle 16 and ground 66 responsive to the interaction of the external air bag 38 with the colliding object. For an inflatable confinement 36 being deeper across the top than across the bottom, i.e. having a "tear-drop" shape, the interaction of the inflatable confinement 36 with a pole-like object 64 generates a vertical component of force $F_a$ that acts to lift the vehicle 16, thereby reducing the vertical component of force upon the tires from $F_g$ to $(F_g-F_a)$, which in turn reduces the associated friction force $F_f$ with the ground 66, where $F_f=m^*(F_g-F_a)$. By reducing ground friction, the external air bag system 12 is more effective at controlling the vehicle kinematics in the horizontal plane. This arrangement is suitable provided that the door 24 is stiff enough to withstand the associated forces.

Figure 8:
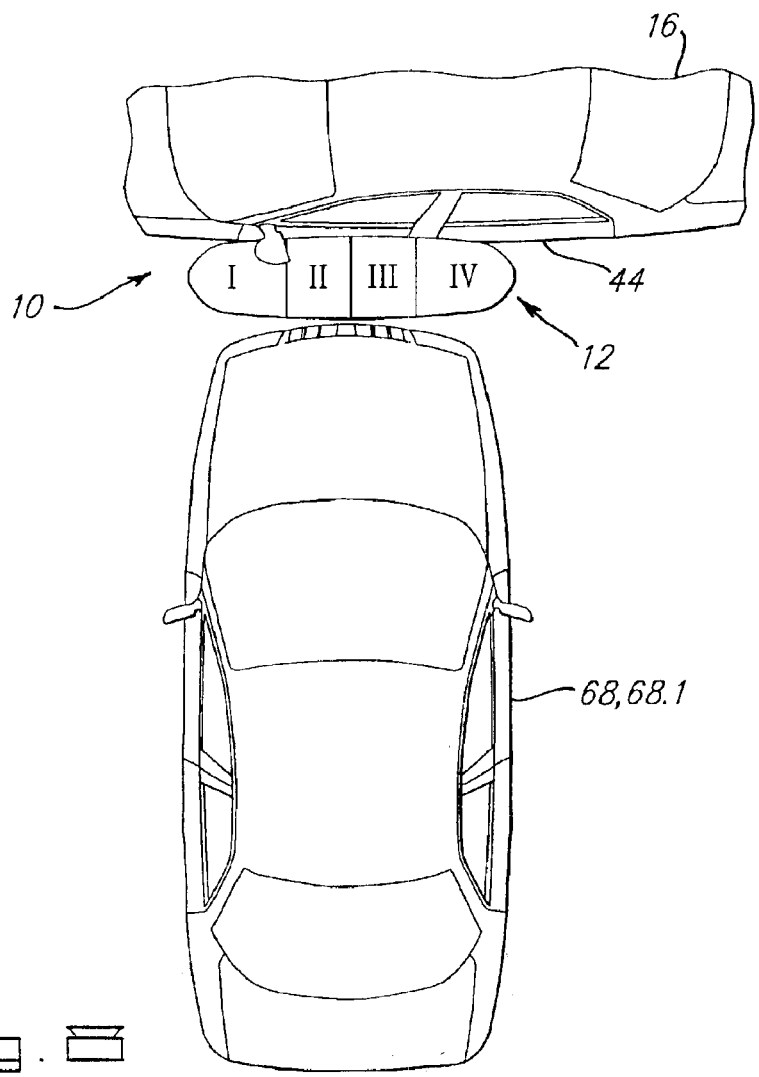
FIG. 8 illustrates a vehicle prior to being impacted by a moving barrier, wherein a predictive collision sensing system in the vehicle has caused an external air bag to be deployed prior to the collision.

If the object is relatively wide, e.g. a barrier-like object having dimension greater than that of two of the inflatable confinements 36, and if the collision of the object with the vehicle 16 is expected to involve at least one relatively stiff zone of the vehicle 16, e.g. zones I or IV, then the gas generator modules 28 are controlled in accordance to what is referred to herein as a "barrier-crash" mode, wherein the inflatable confinements 36 are inflated in a manner that transfers impact energy to one or more relatively stiff zones for which, responsive to a collision, the occupant 18 is relatively less susceptible to injury; while also reducing the relative speed of the collision. For example, referring to FIG. 8, responsive to a barrier-like object 68, e.g. a moving barrier vehicle 68.1, the inflatable confinements 36 associated with zones I and IV (43), are each inflated with two or more stages 32 of the respective multi-stage gas generators

30.1, whereas the inflatable confinements 36 associated with zones II and III (43), are each inflated with only the first stage 32.1 of the respective multi-stage gas generators 30.1. Accordingly, the inflatable confinements 36 associated with zones I and IV (43) are relatively stiffer than the inflatable confinements 36 associated with zones II and III (43), so as to transfer more of the impact force to the A-pillar 48 and the B-pillar 50 respectively, which accordingly reduces the deformation of zones II and III (43) of the vehicle 16, thereby protecting an occupant 18 adjacent thereto from otherwise greater injury.

The control of the gas generator modules 28, i.e. a "pole-crash" mode or a "barrier-crash" mode as described hereinabove, is responsive to the identification of the collision object, either entirely by the predictive collision sensing system 14; or—alternately or in combination with—the above described means for sensing an interaction of the inflatable confinement 36 with an impinging object after inflating each of the inflatable confinements 36 to a respective first level of inflation.

Figure 9:
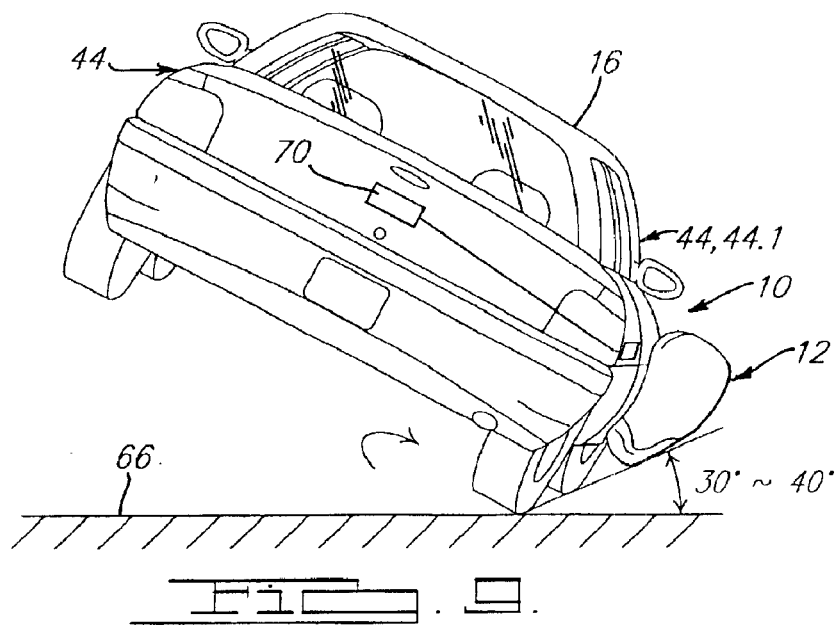
FIG. 9 illustrates a vehicle during a roll-over condition.

The occupant protection system 10 can also be beneficial for protecting an occupant 18 under some vehicle rollover conditions, wherein the associated control mode is similar to that of the "barrier-crash" mode described hereinabove, wherein the ground 66 upon which the vehicle 16 rolls has a relatively broad impact surface similar to that of a barrier. Responsive to a roll event, for example, detected by a separate rollover sensing system 70—for example in accordance with commonly assigned U.S. Provisional Application No. 60/272,611 filed on Mar. 1, 2000, which is incorporated herein by reference,—the inflatable confinements 36 proximate to the A-pillar 48 and the B-pillar 50 respectively are inflated to a higher level of inflation than the inflatable confinements 36 proximate to the occupant 18, so that the relatively stiff A-pillar 48 and B-pillar 50 regions of the vehicle bear a greater proportion of the force to the leading side 44.1 of the vehicle 16 during the roll event, thereby cushioning the impact to the leading side 44.1 of the vehicle 16, and also reducing the likelihood of a repeated rollover. For example, the rollover sensing system 70 of U.S. Provisional Application No. 60/272,611 uses measurements of roll rate and lateral acceleration to anticipate if the vehicle 16 is likely to roll, and the crash is anticipated sufficiently far in advance of the actual roll event to deploy the inflatable confinements 36 on the leading side 44.1 of the vehicle 16 prior to contact thereof with the ground 66. For example, referring to FIG. 9, if the inflatable confinements 36 on the leading side 44.1 were to be fully deployed with the vehicle inclined at about 30 to 40 degrees, there could be about 200 to 300 milliseconds after reliable discrimination of a roll event by the rollover sensing system 70 within which to either inflate the associated inflatable confinements 36 or to confirm the occurrence of the roll event and then inflate the associated inflatable confinements 36 thereafter.

Referring to FIG. 10, the occupant protection system 10 may further comprise a second external air bag inflator module 22.2 located in a rear door 24.2 on the same side 44 of the vehicle 16, and/or a third external air bag inflator module 22.3 mounted rearward of the rear door 24.2, each operatively coupled to the processor 60.

The second external air bag inflator module 22.2 comprises a plurality of gas generator modules 28 and associated inflatable confinements 36 arranged across the rear door 24.2 so that when inflated, the associated inflatable confinements 36 are adjacent to one another, each associated with—i.e. aligned with—a different zone V and VI (43) of the associated side 44 of the vehicle 16. Each zone V and VI (43) has an associated level of structural stiffness and an associated level of proximity to the rear occupant 18. For example, zone VI (43) is proximate to the C-pillar 72, which has a relatively high level of structural stiffness and which are relatively less proximate to the rear occupant 18 than is zone V (43). Accordingly, an occupant 18 would generally be more susceptible to injury from an impact of the vehicle 16 in zone V (43)—which, being relatively less stiff, is more susceptible to crush responsive to an impact—than from an impact in zone VI (43).

Responsive to a collision predicted by the predictive collision sensing system 14, the operation of the second external air bag inflator module 22.2, if present, is similar to that of the (first) external air bag inflator module 22 described herein above, and provides for protecting an occupant 18 seated proximate to the rear door 24.2 from injury responsive to the predicted side-impact collision, for example, by inflating the inflatable confinement 36 proximate to zone V at a higher level of inflation than would the inflatable confinement 36 proximate to zone VI in order to deflect the vehicle 16 relative to a pole-like object 64 predicted to impact that zone, so as to move an associated eventual impact location to a location with relatively high lateral stiffness, e.g. the B-pillar 50 or an associated C-pillar 72. Furthermore, responsive to a predicted impact by a barrier-like object 68 proximate to rear occupant 18, the inflatable confinements 36 proximate to zones IV and VI (43) would be inflated at a higher level of inflation than would the inflatable confinement 36 proximate to zone V, so as to transfer more of the impact forces of the collision to the relatively stiff B-pillar 50 and C-pillar 72.

The third external air bag inflator module 22.3 comprises an associated gas generator module 28 and an associated inflatable confinement 36 in a rear panel proximate to the C-pillar 72, associated with—i.e. aligned with—a relatively stiff zone VII (43) of the associated side 44 of the vehicle 16. Responsive to a predicted impact by a barrier-like object 68 proximate to rear occupant 18, the inflatable confinement 36 proximate to zone VII (43) would be inflated at a relatively higher level of inflation so as to transfer more of the impact forces of the collision to the relatively stiff C-pillar 72.

The second 22.2 and third 22.3 external air bag inflator modules can be beneficial in improving the protection of an occupant 18 from a roll event, particularly a roll event that does not exhibit significant pitch or yaw motion of the vehicle. Responsive to the detection of a roll event by the rollover sensing system 70 the inflatable confinements 36 proximate to the A-pillar 48 (i.e. zone I (43)), the B-pillar 50 (i.e. zone IV (43)), and the C-pillar 72 (i.e. zones VI or VII (43)) are inflated to a higher level of inflation than the inflatable confinements 36 proximate to the occupant(s) 18, so that the relatively stiff A-pillar 48, B-pillar 50, and C-pillar 72 regions of the vehicle bear a greater proportion of the force to the leading side 44.1 of the vehicle 16 during the roll event, thereby cushioning the impact to the leading side 44.1 of the vehicle 16, and also reducing the likelihood of a repeated rollover. By providing for the inflation of at least one inflatable confinement 36 proximate to the C-pillar 72, the second 22.2 and/or third 22.3 external air bag inflator modules reduce or eliminate a yawing of the vehicle 16 that could otherwise occur if only the first external air bag inflator module 22 were deployed. The second 22.2 and/or third 22.3 external air bag inflator modules also provide for improved protection of an occupant 18 seated in the rear of the vehicle 16.

Figure 11:
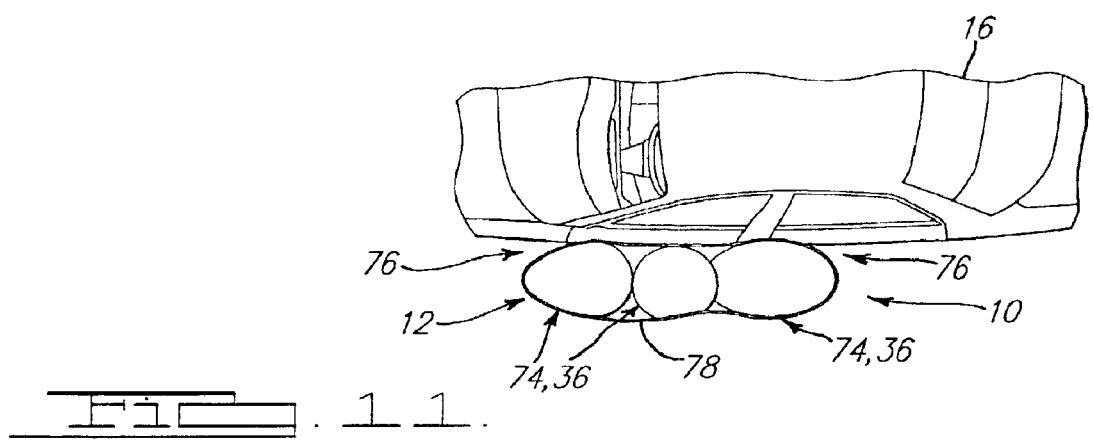
FIG. 11 illustrates another embodiment of an external air bag system.

Referring to FIG. 11, in accordance with another embodiment, the inflatable confinements 36 of the external air bag system 12 may comprise a plurality of external air bags 74, which, for example, may be incorporated in separate external air bag inflator modules 76, each incorporating an associated gas generator module 28 comprising either a at least one gas generator 30 or a multi-stage gas generator 30.1. The plurality of external air bags 74 are at least partially bounded by an external shroud 78 that forms a continuous surface that contacts the colliding object and prevents the colliding object from otherwise becoming lodged between two of the external air bags 74. The external shroud 78, for example, may comprise either a fabric or other flexible material that is, for example, stored within an external door panel. Alternately, the external shroud 78 may comprise at least a portion of an external door panel, the ends of which are each operatively coupled to an associated fabric or other flexible material that forms a continuous surface from the respective ends of the external door panel to the respective body of the vehicle 16, or to the housings of the outermost external air bag inflator modules 76.

Figure 12:
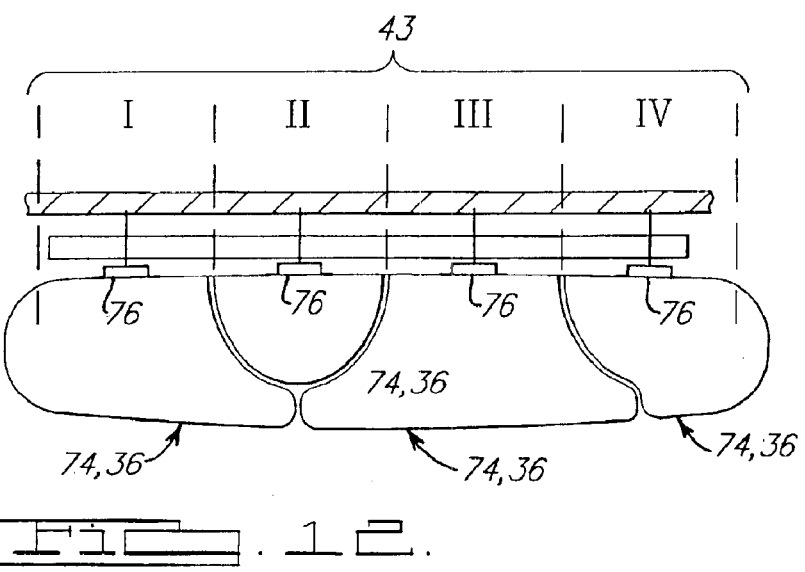
FIG. 12 illustrates yet another embodiment of an external air bag system.

Referring to FIG. 12, in accordance with another embodiment, the inflatable confinements 36 of the external air bag system 12 may comprise a plurality of external air bags 74, which, for example, may be incorporated in separate external air bag inflator modules 76, each incorporating an associated gas generator module 28 comprising either a at least one gas generator 30 or a multi-stage gas generator 30.1. The plurality of external air bags 74 are shaped so as to interlock with one another, so as prevent the colliding object from otherwise becoming lodged between two of the external air bags 74, thereby precluding the need for an external shroud 78, as illustrated in the embodiment of FIG. 11. Whereas the external air bag inflator modules 76 are illustrated in a door 24 as in FIG. 2, the external air bag inflator modules 76 could be located elsewhere as well, for example, if the fixed structure of the vehicle 16, e.g. proximate to the A-pillar 48, the B-pillar 50 or the C-pillar 72, or in an adjacent door, wherein the external air bags 74 are adapted to interlock with one—when inflated—another across the boundaries of the fixed structure and the doors.

Figure 13:
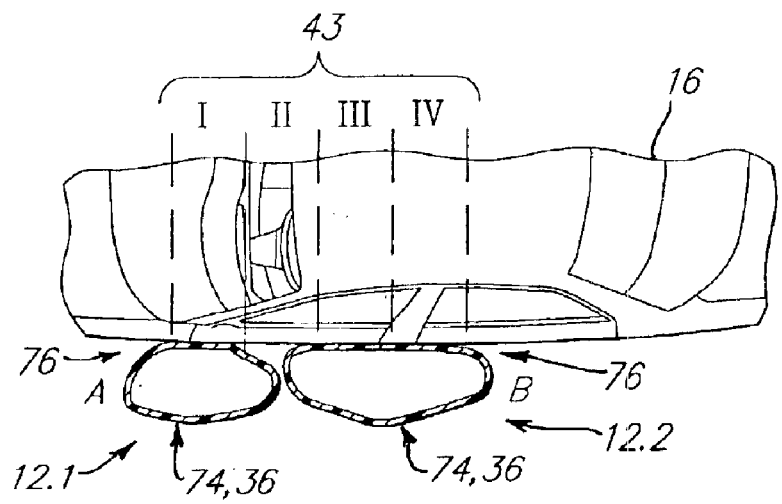
FIG. 13 illustrates yet another embodiment of an external air bag system.

Referring to FIG. 13, in accordance with another embodiment, the external air bag system 12 may comprise a plurality of external air bag subsystems 12.1, 12.2, each incorporating either an external air bag inflator module 76 with a single external air bag 74 defining an associated inflatable confinement 36; or an external air bag inflator module 22 with a plurality of inflatable confinements 36, for example, an external air bag 38 with a plurality of chambers 40 separated by baffles 42 as described hereinabove. Each associated external air bag inflator module 76, 22 further comprises at least one gas generator 30 or a multi-stage gas generator 30.1 operatively coupled to the associated inflatable confinement(s) 36. As distinguished from the embodiment illustrated in FIG. 11, the different external air bag subsystems 12.1, 12.2 are independent of one another, i.e. the associated inflatable confinement(s) 36 are not contained within a common, external shroud 78. In the embodiment illustrated in FIG. 13, an external air bag inflator module 76 associated with one external air bag subsystem 12.1—illustrated with the associated inflated inflatable confinement 36 labeled "A"—is associated with zone I (43) proximate to the A-pillar 48, and an external air bag inflator module 76 associated with another external air bag subsystem 12.2—illustrated with the associated inflated inflatable confinement 36 labeled "B"—is associated with zone III (43), i.e. proximate to the seating location of an occupant 18, but with the associated inflatable confinement 36 extending to zone IV (43). Accordingly, for purposes of illustration, both inflatable confinements "A" and "B" are illustrated as respective single external air bags 74.

In operation, responsive to the predictive collision sensing system 14 predicting an impact of the door 24, including zones I–IV (43), by a barrier-like object 68, then both inflatable confinements "A" and "B" are deployed at a relatively high level of inflation so as to transfer the associated impact forces to the relatively stiff A-pillar 48 and B-pillar 50 portions of the vehicle. Responsive to the predictive collision sensing system 14 predicting an impact of the of zone III (43) by a pole-like object 64, then only the inflatable confinement "B" proximate to zone III (43) is inflated at a relatively high level of inflation, so as to deflect the vehicle 16 relative to the pole-like object 64 as described hereinabove, so that the ultimate impact occurs in either zones I or IV (43), depending upon where the pole-like object 64 actually impacts the inflatable confinement "B", and upon the associated forces and momentum. Responsive to the predictive collision sensing system 14 predicting an impact of either zones I, II or IV (43) by a pole-like object 64, then neither of the inflatable confinements "A" or "B" are deployed, so that the pole-like object 64 is allowed to impact that associated portion of the vehicle 16 for which the occupant 18 is relatively less susceptible to injury.

Figure 14:
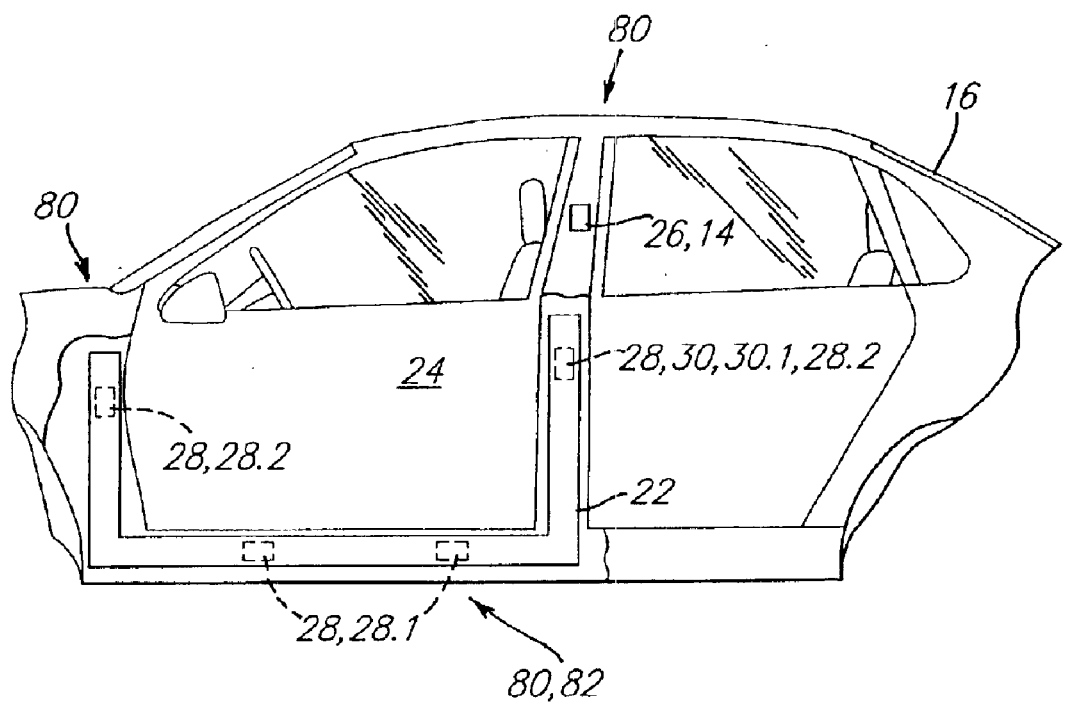
FIG. 14 illustrates an embodiment of an occupant protection system incorporated in a side frame assembly a vehicle, wherein the associated external air bag system is not deployed.
Figure 15:
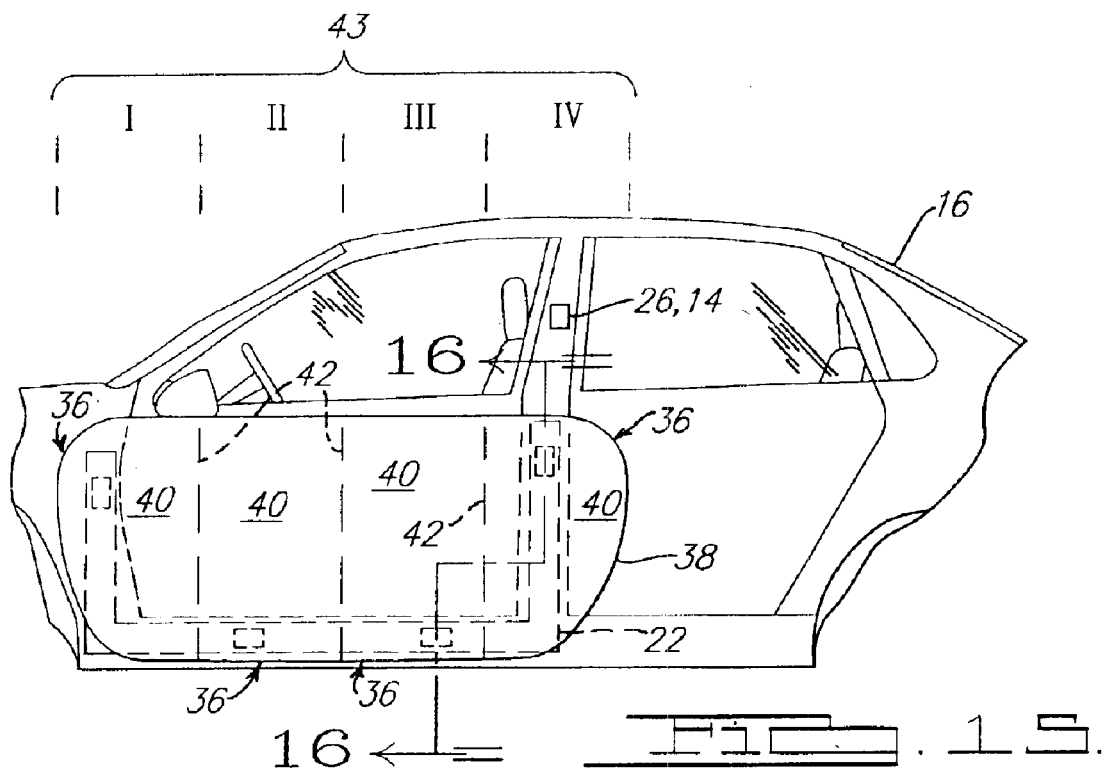
FIG. 15 illustrates the embodiment of the occupant protection system of FIG. 14, wherein the associated external air bag system is deployed.

Referring to FIG. 14, the external air bag system 12 may incorporate an external air bag inflator module 22 in a fixed portion of the body or frame of the vehicle 16 that is not necessarily immediate proximate to the occupant 18 to be protected, as would be the door 24 in the embodiment(s) described hereinabove. For example, in a side-protection occupant protection system 10, the external air bag system 12 may incorporate an external air bag inflator module 22 in the side frame assembly 80. The external air bag inflator module 22 comprises a plurality of gas generator modules 28, each, for example, comprising at least one gas generator 30 or an associated multi-stage gas generator 30.1. The gas generator modules 28 are arranged in the side frame assembly 80 so as to partially surround the associated door 24. Each of the plurality of gas generator modules 28 is operatively coupled to an associated one of a plurality of inflatable confinements 36, so that there is a one-to-one relationship between the gas generator modules 28 and the corresponding inflatable confinements 36. As an example, FIG. 15 illustrates an external air bag 38 having a plurality of chambers 40 that are isolated from one another by associated baffles 42, wherein each chamber 40 constitutes an inflatable confinement 36. The gas generator modules 28.1 located ahead of and behind the door in the A-pillar 48 and the B-pillar 50 respectively are located at a different height on the side frame assembly 80 than are the gas generator modules 28.2 located in the rocker panel 82 below the door 24, although conceivably all of the gas generator modules 28 could be located at the same lower height. Accordingly, referring to FIG. 16, different gas generator modules 28.1, 28.2 at different heights attach to the different inflatable confinements 36 at different locations relative to the inflated inflatable confinements 36. When inflated, the inflatable confinements 36 provide for a continuous inflated external air bag 38 that extends across and beyond the door 24. Aside from a different packaging, the external air bag inflator module 22 otherwise functions as described hereinabove.

Figure 18:
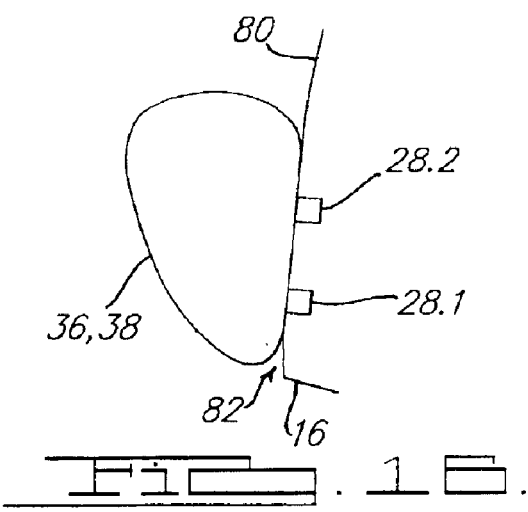
FIG. 18 illustrates the embodiment of the occupant protection system of FIG. 17, wherein the associated external air bag system is deployed.
Figure 19:
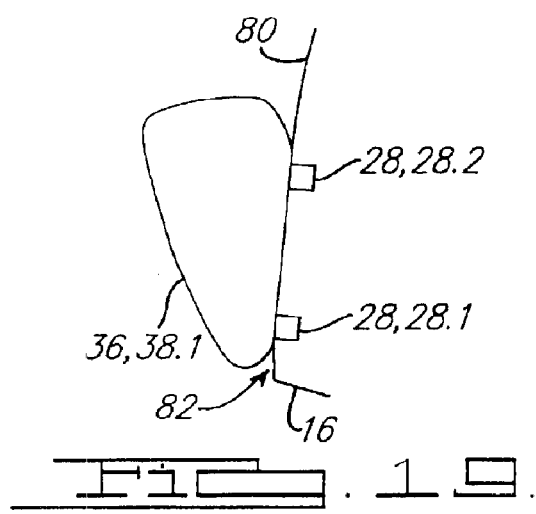
FIG. 19 illustrates a cross-section of the external air bag system of FIG. 18.
Figure 17:
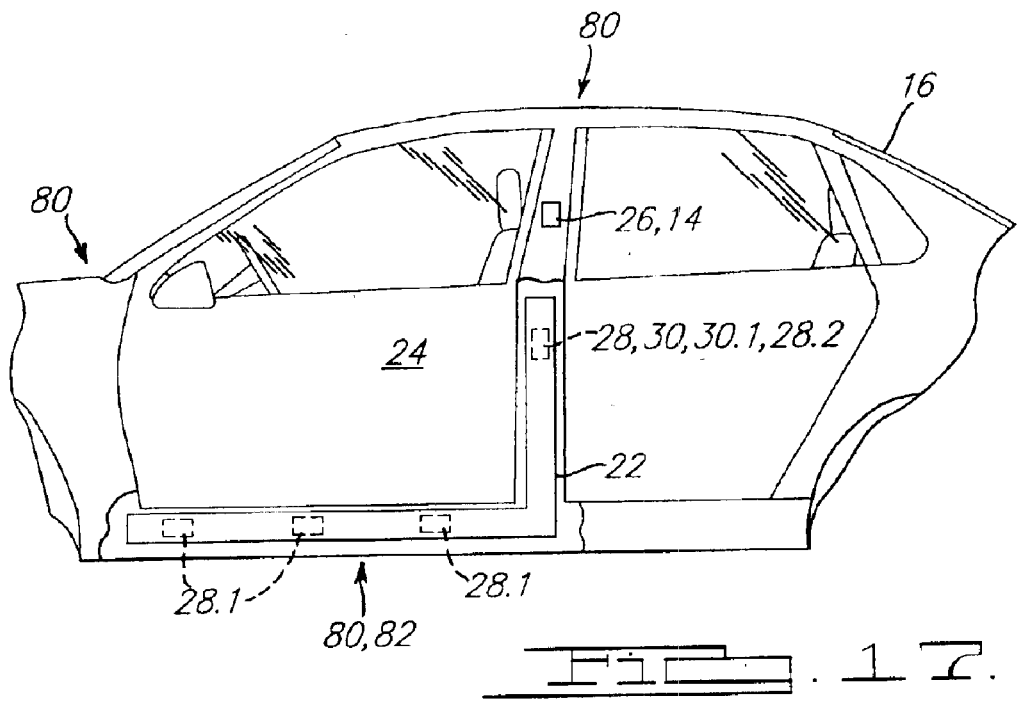
FIG. 17 illustrates another embodiment of an occupant protection system incorporated in a side frame assembly a vehicle, wherein the associated external air bag system is not deployed.
Figure 18:
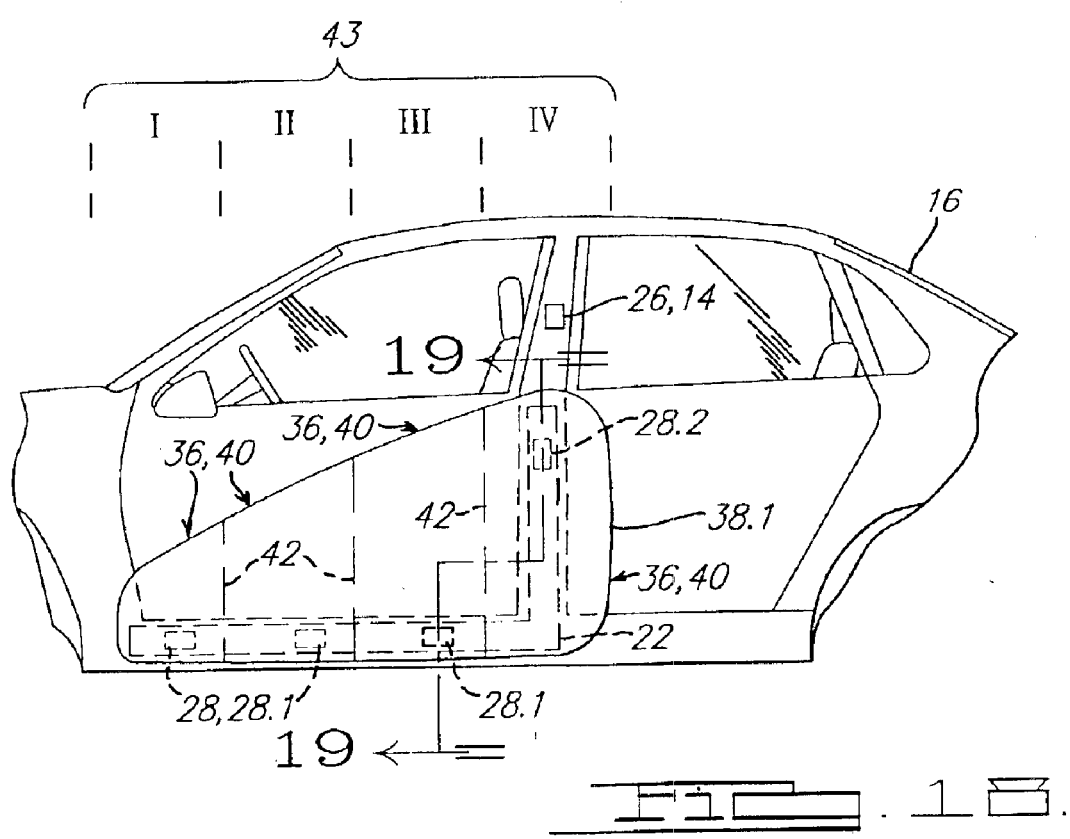

Referring to FIG. 17, in another example, of an external air bag system 12 incorporating an external air bag inflator module 22 in a side frame assembly 80, the external air bag inflator module 22 comprises a plurality of gas generator modules 28—each, for example, comprising at least one gas generator 30 or an associated multi-stage gas generator 30.1—arranged in the side frame assembly 80 so as to partially surround the associated door 24, wherein a first set of gas generator modules 28.1 are arranged within the rocker panel 82 below the door 24, and another gas generator module 28.2 located at a higher location in the B-pillar 50, although conceivably all of the gas generator modules 28 could be located at the same lower height. Each of the plurality of gas generator modules 28 is operatively coupled to an associated one of a plurality of inflatable confinements 36, so that there is a one-to-one relationship between the gas generator modules 28 and the corresponding inflatable confinements 36. As an example, FIG. 18 illustrates an external air bag 38.1 having a plurality of chambers 40 that are isolated from one another by associated baffles 42, wherein each chamber 40 constitutes an inflatable confinement 36. The external air bag 38.1 is shaped so that the height thereof is greater behind the occupant location than in front of the occupant location, so that the associated inflatable confinements 36 proximate to the occupant 18 provide greater energy absorption capacity than do the inflatable confinements 36 forward of the occupant 18. When inflated, the inflatable confinements 36 provide for a continuous inflated external air bag 38.1 that extends across and beyond the door 24. Referring to FIG. 19, different gas generator modules 28.1, 28.2 at different heights attach to the different inflatable confinements 36 at different locations relative to the inflated inflatable confinements 36. Aside from a different packaging, the external air bag inflator module 22 otherwise functions as described hereinabove. The external air bag 38.1 can be shaped to as to extend higher than illustrated in FIG. 19, for example, so that the triangular area thereof extends to near the top of the B-pillar 50, so as to provide protection for the head of the occupant 18.

Whereas the occupant protection system 10 has been illustrated herein for providing protection from a side-impact collision, the occupant protection system 10 could also be adapted to provide protection from collisions involving other portions of the vehicle, e.g., offset collisions proximate to a corner of the vehicle. For example, an external air bag system 12 incorporating a plurality of inflatable confinements 36 can be incorporated at the front of the vehicle 16 to either shift the vehicle laterally (left or right) from a pole-like object 64, or to provide controlled energy absorption when impacting a barrier-like object 68.

Figure 20:
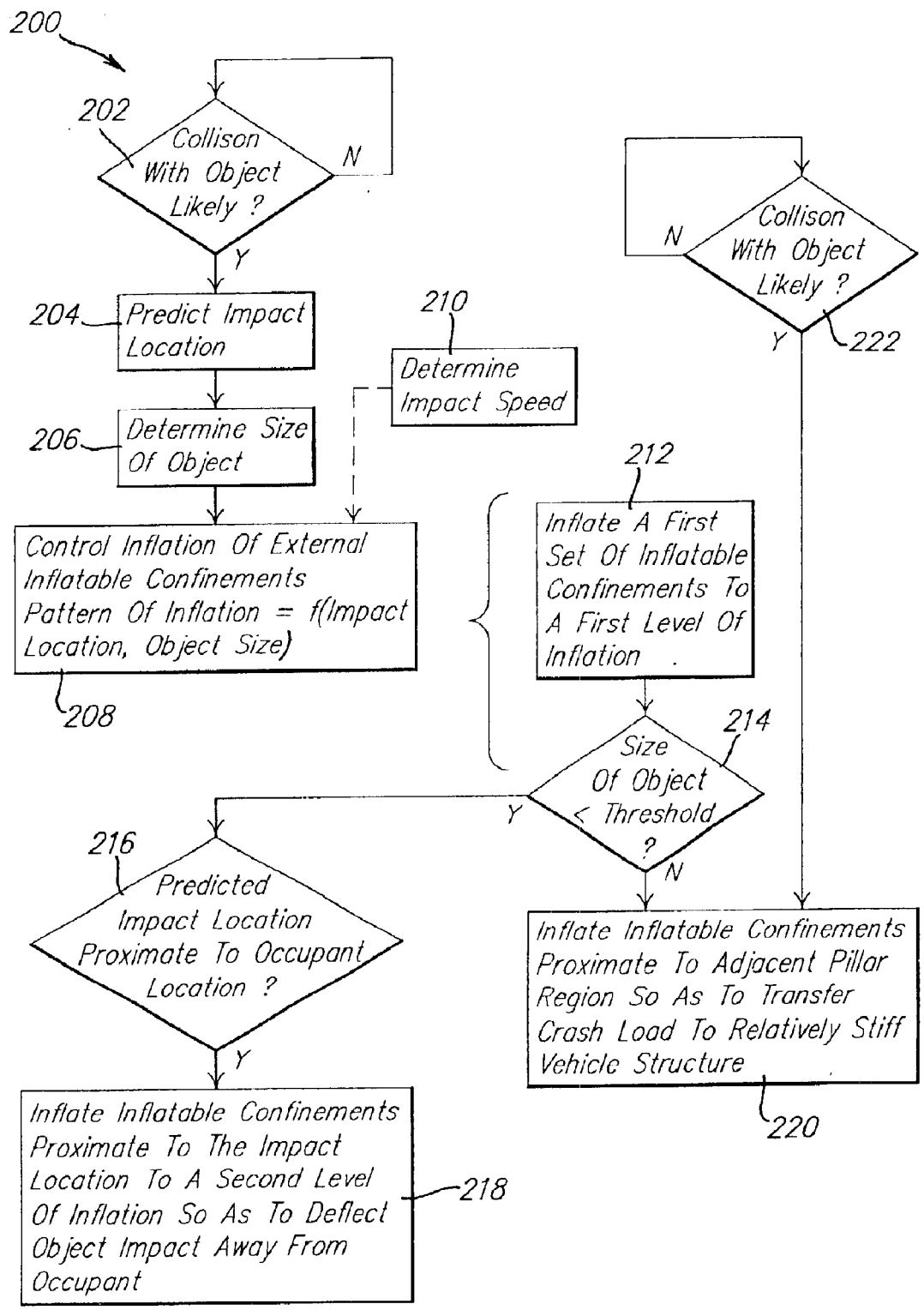
FIG. 20 illustrates a method of protecting an occupant of a vehicle from a collision between the vehicle and an object external to the vehicle.

Referring to FIG. 20, a method 200 of protecting an occupant of a vehicle from a collision between the vehicle and an object external to the vehicle commences with step (202) wherein the predictive collision sensing system 14 predicts whether a collision which an object external to the vehicle 16 is likely. If so, then, in steps (204) and (206) respectively, the predictive collision sensing system 14 further determines a prediction of the corresponding impact location on the vehicle, and determines a size of the object. In step (208), the processor 60 controls an inflation—or more particularly, a pattern of inflation—of a plurality of inflatable confinements 36 responsive to the predicted impact location and the size of the object, and also potentially responsive to a measure of impact speed from step (210) or a measure of collision severity responsive thereto.

The pattern of inflation comprises a selection of which inflatable confinements 36 are inflated. For those inflatable confinements that can be controllably inflated, for example, by a either a plurality of gas generators 30 or to a multi-stage gas generator 30.1, the pattern of inflation further comprises by how much each inflatable confinement 36 is inflated as a function of time, for example, which gas generators 30 or stages 32 are actuated and when. For example, the pattern of inflation may comprise, in step (212), inflating to a fist level of inflation a first set of inflatable confinements 36 which are located on the same side 44 of the vehicle 16 as the predicted impact location. Then, the pattern of inflation further comprises inflating a second set of inflatable confinements 36 either to a second level of inflation, if previously inflated, or to a first level of inflation, wherein the elements of the second set are selected responsive to the size of the object and the predicted location of the impact.

For example, in step (214), if the size of the object is less than a threshold, e.g. indicating a pole-like object, and, in step (216), if the predicted impact location is proximate to an occupant location, then, in step (218), at least one inflatable confinement 36 is inflated proximate to the predicted impact location so as to cause the actual impact location on the vehicle 16 to be deflected away from an occupant location, e.g. by perturbing the trajectory of the vehicle 16 relative to the object. The particular selection of inflatable confinements 36 can also be dependent upon the arrangement, size and location thereof relative to the vehicle, and upon the location of the center of gravity of the vehicle, e.g. relative to the impact location and to the inflatable confinements 36. For example, the predictive collision sensing system 14 may provide a measure of the direction of the velocity of the vehicle 16 relative to the object, which, together with the predicted impact location, the location of the center of gravity of the vehicle, and arrangement and location of the inflatable confinements 36 generally proximate to the predicted impact location, provides for determining a preferable direction in which to deflect the vehicle relative to the object, and to then select the appropriate set of inflatable confinements 36 to be inflated at a relatively high level of inflation so as to cause the associated deflection of the impact location. Generally, at least two of the inflatable confinements 36 are inflated by substantially different amounts so as to cause a lateral deflection—i.e. relative to the impact direction, and therefore, along the impacted side of the vehicle—of the object relative to the vehicle 16 following engagement of the object by at least one of the plurality of inflatable confinements 36. Otherwise, from step (216), in one embodiment, the inflatable confinements 36 would not be inflated to a higher level of inflation if the predicted impact location were proximate to a relatively rigid portion of the vehicle 16, such as a pillar region, so as to not deflect the impact location towards an occupant location.

Otherwise, from step (214), if the size of the object is greater than a threshold—as would occur with a barrier-like object 68 or the ground 66 in a rollover situation as detected in step (222),—then, in step (220), at least one of the plurality of inflatable confinements—adapted to transfer load to at least one structural member of the vehicle that is substantially stiffer responsive to the collision than is a portion of said vehicle proximate to a proximate occupant location—is inflated or further inflated so as to transfer the crash load to a relatively stiff vehicle structure, e.g. an A-pillar, B-pillar, C-pillar or combination thereof.

Accordingly, there is provided a method of protecting an occupant of a vehicle from a collision between the vehicle and an object external to the vehicle, comprising 1) predicting if the vehicle is likely to collide with the object proximate to a first location on the vehicle; 2) detecting a size of the object; and 3) deploying an inflatable confinement external of the vehicle proximate the first location if the operation of predicting predicts that the vehicle is likely to collide with the object proximate to the first location, and if the operation of detecting detects that the size of the object is less than a first threshold. For example, the first location may be proximate to a seating location of the occupant. There is also provided a method of protecting an occupant of a vehicle from a collision between the vehicle and an object external to the vehicle further comprising deploying at least one inflatable confinement external of the vehicle proximate to at least one second location if the size of the object is greater than a second threshold, wherein a portion of the vehicle at the at least one second location is substantially stiffer responsive to the collision than is a portion of the vehicle at the first location, and the at least one second location is proximate to the first location. For example, the at least one second location comprises at least two second locations, wherein the first location is between two of the at least two second locations. As another example, the first location comprises a location on a door of the vehicle, and the at least one second location comprises at least one of a location proximate to an A-pillar adjacent to the door and a location proximate to a B-pillar adjacent to the door. For example, the first location may comprises a location on a door of the vehicle, and the at least one second location may comprise a second location proximate to an A-pillar adjacent to the door and another second location proximate to a B-pillar adjacent to the door.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

We claim:

1. A method of protecting an occupant of a vehicle from a collision between the vehicle and an object external to the vehicle, comprising:
   a. predicting if the vehicle is likely to crash with the object at an impact location;
   b. determining a prediction of said impact location on the vehicle;
   c. determining a size of the object; and
   d. controlling an inflation of a plurality of inflatable confinements external of the vehicle responsive both to said impact location and to said size of the object.

2. A method of protecting an occupant of a vehicle from a collision between the vehicle and an object external to the vehicle as recited in claim 1, wherein the operation of controlling the inflation of said plurality of inflatable confinements comprises controlling a pattern of inflation of said plurality of inflatable confinements.

3. A method of protecting an occupant of a vehicle from a collision between the vehicle and an object external to the vehicle as recited in claim 2, wherein said pattern of inflation comprises initially inflating a first set of inflatable confinements to a first level of inflation, and then inflating a second set of inflatable confinements to a second level of inflation.

4. A method of protecting an occupant of a vehicle from a collision between the vehicle and an object external to the vehicle as recited in claim 2, wherein said pattern of inflation is further responsive to the arrangement, size and location of said inflatable confinements relative to the vehicle, and to the location of the center of gravity of the vehicle.

5. A method of protecting an occupant of a vehicle from a collision between the vehicle and an object external to the vehicle as recited in claim 1, wherein the operation of controlling the inflation of a plurality of inflatable confinements comprises controlling an inflation power by which at least one inflatable confinement is inflated, and said inflation power is controlled responsive to at least one of a measure of impact speed, a mass of the vehicle, and a stiffness of the vehicle proximate to said at least one inflatable confinement.

6. A method of protecting an occupant of a vehicle from a collision between the vehicle and an object external to the vehicle as recited in claim 1, wherein responsive to said size being less than a first threshold and the vehicle being likely to crash with the object, the operation of controlling the inflation of a plurality of inflatable confinements comprises providing for inflating at least two of said plurality of inflatable confinements by substantially different amounts so as to cause a lateral deflection of the object relative to the vehicle following engagement of the object by at least one of said plurality of inflatable confinements.

7. A method of protecting an occupant of a vehicle from a collision between the vehicle and an object external to the vehicle as recited in claim 6, wherein an inflatable confinement located proximate to said impact location is inflated to a higher level than another of said plurality of inflatable confinements.

8. A method of protecting an occupant of a vehicle from a collision between the vehicle and an object external to the vehicle as recited in claim 6, wherein said operation of controlling the inflation of a plurality of inflatable confinements is further dependent upon said impact location comprising a location proximate to a location of an occupant of the vehicle.

9. A method of protecting an occupant of a vehicle from a collision between the vehicle and an object external to the vehicle as recited in claim 8, wherein said location proximate to a location of an occupant of the vehicle comprises a location on a door of the vehicle, wherein said door is proximate to said plurality of inflatable confinements.

10. A method of protecting an occupant of a vehicle from a collision between the vehicle and an object external to the vehicle as recited in claim 1, wherein responsive to said size being greater than a threshold and the vehicle being likely to crash with the object, the operation of controlling the inflation of a plurality of inflatable confinements comprises providing for inflating at least one of said plurality of inflatable confinements that is adapted to transfer load to at least one structural member of the vehicle that is substantially stiffer responsive to the collision than is a portion of said vehicle proximate to a proximate occupant location.

11. A method of protecting an occupant of a vehicle from a collision between the vehicle and an object external to the vehicle as recited in claim 10, wherein said at least one structural member comprises either an A-pillar, a B-pillar or a C-pillar of the vehicle.

12. A method of protecting an occupant of a vehicle from a collision between the vehicle and an object external to the vehicle as recited in claim 11, wherein said plurality of inflatable confinements comprise at least two inflatable confinements, and said at least one structural member comprises at least two different structural members selected from an A-pillar, a B-pillar and a C-pillar of the vehicle.

13. A method of protecting an occupant of a vehicle from a collision between the vehicle and an object external to the vehicle as recited in claim 1, wherein the object comprises a ground surface, the operation of predicting if the vehicle is likely to crash comprises predicting whether the vehicle is likely to rollover, said impact location comprises a leading side of the vehicle, and responsive to a prediction that the vehicle is likely to rollover, the operation of controlling the inflation of a plurality of inflatable confinements comprises providing for inflating at least one of said plurality of inflatable confinements that is adapted to transfer load to at least one structural member of the vehicle that is substantially stiffer responsive to the collision than is a portion of said vehicle proximate to a proximate occupant location.

14. A method of protecting an occupant of a vehicle from a collision between the vehicle and an object external to the vehicle as recited in claim 13, wherein said at least one structural member comprises either an A-pillar, a B-pillar or a C-pillar of the vehicle.

15. An occupant protection system, comprising:
  a. at least one external air bag inflator module, wherein said at least one external air bag inflator module comprises a plurality of inflatable confinements and an associated plurality of gas generator modules, wherein said plurality of inflatable confinements are located so as to cooperate with a common side or end of the vehicle;
  b. a predictive collision sensing system, wherein said predictive collision sensing system comprises at least one predictive collision sensor operatively coupled to the vehicle, and said predictive collision sensing system is adapted to provide i) an indication of whether the vehicle is expected to collide with an external object, ii) a measure of a size of the object, and iii) a predicted location on the vehicle at which the object is expected to collide; and
  c. a processor operatively coupled to said plurality of gas generator modules and to said predictive collision sensing system, wherein said processor controls an actuation of at least one gas generator module responsive to said indication of whether the vehicle is expected to collide with an external object, said measure of said size of the object, and said predicted location on the vehicle at which the object is expected to collide.

16. An occupant protection system as recited in claim 15, wherein said plurality of inflatable confinements are arranged across a door substantially adjacent to one another.

17. An occupant protection system as recited in claim 16, wherein said plurality of inflatable confinements are adapted to cooperate with a door reinforcing beam when inflated so as to transfer an impact force from at least one inflatable confinement to said door reinforcing beam.

18. An occupant protection system as recited in claim 15, wherein at least one said inflatable confinement is adapted to vent inflation gases generated by said associated gas generator module.

19. An occupant protection system as recited in claim 15, wherein at least one said inflatable confinement is adapted to span across both a pillar region and a door region of the vehicle, and responsive to said processor indicating that a collision is likely, and responsive to said measure of said size of the object being less than a threshold, said at least one inflatable confinement is inflated by said at least one external air bag module only if said predicted location on the vehicle at which the object is expected to collide is within said door region.

20. An occupant protection system as recited in claim 15, wherein at least one said inflatable confinement is adapted to span across both a pillar region and a door region of the vehicle, and responsive to said processor indicating that a collision is likely, and responsive to said measure of said size of the object being greater than a threshold, said at least one inflatable confinement is inflated by said at least one external air bag module.

21. An occupant protection system as recited in claim 15, wherein at least one said inflatable confinement has an inflated shape that along a lateral cross-section thereof, comprises a taper of decreasing extent in a downwards direction.

22. An occupant protection system as recited in claim 15, wherein at least two of said plurality of inflatable confinements are located proximate to relatively stiff regions of the vehicle.

23. An occupant protection system as recited in claim 15, wherein at least one of said plurality of inflatable confinements is located proximate to a door proximate to a seating location of the vehicle.

24. An occupant protection system as recited in claim 15, wherein at least two of said plurality of inflatable confinements comprise separate chambers of an air bag.

25. An occupant protection system as recited in claim 15, wherein at least two of said of plurality of inflatable confinements comprise separate air bags.

26. An occupant protection system as recited in claim 25, wherein said separate air bags are adapted to interlock with one another when inflated so as to resist penetration therebetween by an impinging object.

27. An occupant protection system as recited in claim 25, further comprising an external shroud at least partially surrounding at least two of said separate air bags when two of said separate air bags are inflated.

28. An occupant protection system as recited in claim 15, wherein at least one of said gas generator modules comprises a plurality of gas generator elements.

29. An occupant protection system as recited in claim 15, wherein said at least one external air bag inflator module comprises a plurality external air bag inflator modules, each proximate to a different door location on the same side of the vehicle.

30. An occupant protection system as recited in claim 15, wherein said at least one external air bag inflator module is located rearwards of a rearmost door.

31. An occupant protection system as recited in claim 15, wherein said at least one external air bag inflator module is located in a fixed portion of the vehicle at least partially surrounding a door, and said at least one external air bag inflator module comprises an air bag that inflates so as to extend across and beyond a surface of door.

32. An occupant protection system as recited in claim 31, wherein a first at least one said gas generator module is located in a rocker panel below said door.

33. An occupant protection system as recited in claim 32, wherein a second at least one said gas generator module is located in a first pillar region of the vehicle adjacent to said door.

34. An occupant protection system as recited in claim 33, wherein said second at least one said gas generator module is located above said first at least one said gas generator module.

35. An occupant protection system as recited in claim 33, wherein said at least one external air bag module comprises an air bag, and when said air bag is inflated, a first height of said air bag at a location behind a proximate occupant location is greater than a second height of said air bag at a location at or in front of said proximate occupant location.

36. An occupant protection system as recited in claim 33, wherein a third at least one said gas generator module is located in a second pillar region of the vehicle adjacent to said door at a location above said first at least one said gas generator module, and said first and second pillar regions are distinct from one another.

37. An occupant protection system as recited in claim 15, further comprising at least one means for sensing an interaction of said inflatable confinement with an impinging object, wherein said processor is operatively coupled to said at least one means for sensing an interaction of said inflatable confinement with an impinging object and the actuation of at least one gas generator module is controlled responsive thereto.

38. An occupant protection system as recited in claim 37, wherein said at least one means for sensing an interaction of said inflatable confinement with an impinging object comprises a pressure sensor.

39. An occupant protection system as recited in claim 15, wherein said at least one predictive collision sensor is selected from a radar sensor, a lidar sensor, an ultrasonic sensor, an infrared sensor, a capacitive sensor and a magnetic sensor adapted to sense a region external of the vehicle.

40. An occupant protection system as recited in claim 15, wherein said at least one predictive collision sensor comprises a magnetic sensor adapted to sense a region external of the vehicle.

41. An occupant protection system as recited in claim 15, wherein said processor controls the actuation of at least one gas generator module responsive to at least one of a measure of the velocity of the object relative to the vehicle and a measure of collision severity responsive to said measure of the velocity of the object relative to the vehicle.

42. An occupant protection system as recited in claim 41, wherein said measure of collision severity is further responsive to at least one of said predicted location on the vehicle at which the object is expected to collide and said measure of said size of the object.

43. An occupant protection system as recited in claim 15, wherein said predictive collision sensor comprises a rollover sensing system, and responsive to a prediction of a rollover by said rollover sensing system, at least one said inflatable confinement proximate to at least one relatively stiff region of the vehicle proximate to said predicted location is inflated to a higher level of inflation than at least one other said inflatable confinement.

44. An occupant protection system as recited in claim 43, wherein said at least one inflatable confinement comprises a plurality of inflatable confinements operatively coupled to a corresponding associated plurality of different relatively stiff regions of the vehicle.

45. An occupant protection system as recited in claim 15, wherein responsive to said indication indicating that the vehicle is expected to collide with an external object, said processor initially provides for inflating a first set of said plurality of inflatable confinements to a first level of inflation.

46. An occupant protection system as recited in claim 15, wherein said processor provides for inflating a second set of said plurality of inflatable confinements to a higher level of inflation than a remaining set of said plurality of inflatable confinements, and said second set of said plurality of inflatable confinements comprises at least one inflatable confinement proximate to said predicted location on the vehicle at which the object is expected to collide.

47. An occupant protection system as recited in claim 46, wherein responsive to said measure of said size of the object being less than a threshold, if said predicted location on the vehicle at which the object is expected to collide is proximate to an occupant location, then at least one inflatable confinement proximate to said predicted location is inflated to a higher level of inflation than at least one other inflatable confinement.

48. An occupant protection system as recited in claim 47, wherein at least one inflatable confinement adjacent to said predicted location is inflated to a higher level of inflation than at least one other inflatable confinement.

49. An occupant protection system as recited in claim 37, wherein if said at least one means for sensing an interaction of said inflatable confinement with an impinging object detects an interaction with at least one said inflatable confinement, then said at least one inflatable confinement is inflated to a higher level of inflation than at least one other inflatable confinement.

50. An occupant protection system as recited in claim 46, wherein responsive to said measure of said size of the object being greater than a threshold, at least one said inflatable confinement proximate to at least one relatively stiff region of the vehicle proximate to said predicted location is inflated to a higher level of inflation than at least one other said inflatable confinement.

51. An occupant protection system as recited in claim 50, wherein said at least one inflatable confinement comprises a plurality of inflatable confinements operatively coupled to a corresponding associated plurality of different relatively stiff regions of the vehicle.

52. A method of protecting an occupant of a vehicle from a rollover of the vehicle, comprising:
   a. predicting whether the vehicle is likely to rollover; and
   b. controlling an inflation of at least one inflatable confinement external of the vehicle responsive to the operation of predicting whether the vehicle is likely to rollover.

53. A method of providing for protecting an occupant of a vehicle from a rollover of the vehicle, comprising:
   a. providing for predicting whether the vehicle is likely to rollover; and
   b. providing for controlling an inflation of at least one inflatable confinement external of the vehicle responsive to the operation of predicting whether the vehicle is likely to rollover.

54. An occupant protection system, comprising:
   a. a rollover sensing system adapted to predict whether a vehicle is likely to rollover; and
   b. at least one external air bag inflator module, wherein said at least one external air bag inflator module comprises at least one inflatable confinement and an associated at least one gas generator module, wherein said at least one inflatable confinement is adapted to deploy external of the vehicle responsive to a signal from said rollover sensing system.

* * * * *

UNITED STATES PATENT AND TRADEMARK OFFICE
CERTIFICATE OF CORRECTION

PATENT NO. : 6,883,631 B2
DATED : April 26, 2005
INVENTOR(S) : Hu et al.

It is certified that error appears in the above-identified patent and that said Letters Patent is hereby corrected as shown below:

Column 2,
Line 14, please delete "that" (2nd occurrence).

Signed and Sealed this

Thirteenth Day of December, 2005

JON W. DUDAS
*Director of the United States Patent and Trademark Office*